US005967273A

United States Patent [19]
Hampton

[11] Patent Number: 5,967,273
[45] Date of Patent: Oct. 19, 1999

[54] MAGNETO-RHEOLOGICAL FLUID COUPLING

[75] Inventor: Keith Hampton, Ann Arbor, Mich.

[73] Assignee: Eaton Corporation, Cleveland, Ohio

[21] Appl. No.: 08/953,148

[22] Filed: Oct. 17, 1997

[51] Int. Cl.[6] ........ F16D 37/02
[52] U.S. Cl. ........ 192/21.5
[58] Field of Search ........ 192/21.5, 58.4, 192/58.61, 84.96; 188/267.2

[56] References Cited

U.S. PATENT DOCUMENTS

| | | | |
|---|---|---|---|
| 2,685,947 | 8/1954 | Votrian | 192/21.5 |
| 2,772,762 | 12/1956 | Gamundi et al. | 192/21.5 |
| 2,818,148 | 12/1957 | Winther | 192/21.5 |
| 4,611,697 | 9/1986 | Okita et al. | 192/21.5 |
| 4,681,197 | 7/1987 | Pedu | 192/21.5 |
| 4,898,266 | 2/1990 | Garrett et al. | 192/21.5 |
| 4,898,267 | 2/1990 | Garrett et al. | 192/21.5 |
| 4,920,929 | 5/1990 | Bishop | 123/41.49 |
| 5,667,715 | 9/1997 | Foister | 252/62.52 |
| 5,823,309 | 10/1998 | Gopalswamy et al. | 192/21.5 |

*Primary Examiner*—Tamara L. Graysay
*Assistant Examiner*—Debra A. Belles
*Attorney, Agent, or Firm*—L. J. Kasper

[57] ABSTRACT

A magneto-rheological fluid coupling (11) including a stationary electromagnetic coil (31) and cylindrical contact member (43) surrounding an input shaft (19), and in turn, being surrounded by the output coupling assembly (15). Input (63,65) and output (29) coupling members define a viscous shear chamber (71) disposed radially outward from the coil (31). A drive member (21) extends radially from the input shaft (19) and includes an annular portion (61) at least partially surrounding the coil (31) and driving the input coupling member (63,65). The stationary coil (31) and contact member (43) eliminates the need for electrical brushes, and the problems associated therewith, and the overall arrangement of the coupling (11) results in only radial non-working air gaps, such that the efficiency and repeatability of the device is substantially improved.

11 Claims, 2 Drawing Sheets

FIG. 2
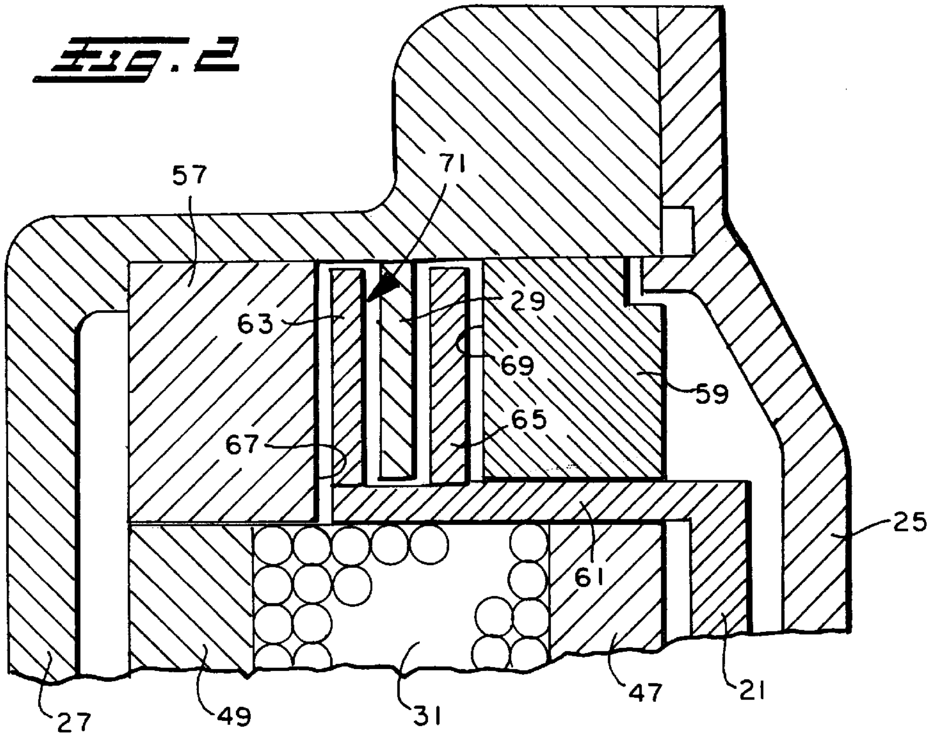
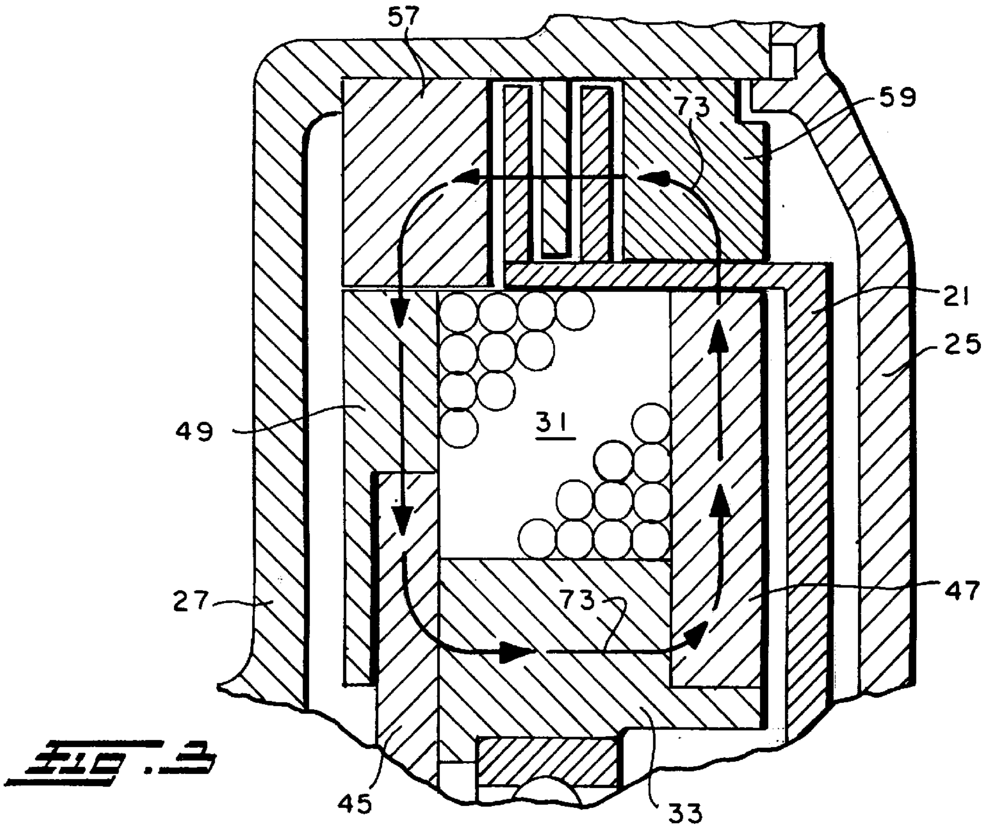
FIG. 3

MAGNETO-RHEOLOGICAL FLUID COUPLING

CROSS-REFERENCE TO RELATED APPLICATIONS

Not applicable

STATEMENT REGARDING FEDERALLY SPONSORED RESEARCH OR DEVELOPMENT

Not applicable

MICROFICHE APPENDIX

Not applicable

BACKGROUND OF THE DISCLOSURE

The present invention relates to viscous fluid couplings, and more particularly, to such couplings in which the viscous fluid comprises a magneto-rheological fluid.

Viscous fluid couplings have been in commercial use for many years. A typical use is to drive the radiator cooling fan of a vehicle engine, wherein the engine is of the “north-south” type, i.e., where the axis of the engine is oriented in the direction of the axis of the vehicle. Such couplings are also commonly referred to as “viscous fan drives”, and although the present invention is not limited to use as a fan drive, the invention is especially advantageous when used as a fan drive, and will be described in connection therewith.

In typical prior art viscous couplings, especially those used as fan drives, the coupling includes both an operating chamber, where viscous fluid shear occurs, and a reservoir chamber, in which viscous fluid is stored when it is not in the operating chamber. In the prior art coupling, the relationship between output speed and input speed is determined by the extent to which the operating chamber is filled with fluid. In most fan drive applications, the amount of filling of the operating chamber is determined by a valving mechanism, which controls the position of a valve member in response to a sensed temperature condition, such as local, ambient air temperature.

There is an increasing demand for viscous fan drives in which the ratio of output speed to input speed is determined by a remotely sensed temperature condition, such as the “top tank” temperature in the radiator. In such a cooling system, it is desirable to sense the remote temperature, generate a corresponding electrical signal, and transmit that signal to the fan drive, where the signal is used to move a valve member, or somehow vary the transmission of torque from the input coupling to the output coupling.

U.S. Pat. Nos. 4,898,266 and 4,898,267, both of which are assigned to the assignee of the present invention, and incorporated herein by reference, teach viscous fluid couplings in which torque transmission is varied by varying an electrostatic field impressed upon a shear chamber containing an electroviscous fluid. Unfortunately, such electroviscous fluids have not yet been developed to the point where such devices are commercially operable and feasible.

U.S. Pat. No 4,920,929 discloses another general type of viscous coupling in which the ratio of output to input varies in response to variations in an electrical input signal. In the ’929 reference, there is a very general disclosure of a coupling in which either an electric or magnetic field is impressed across the viscous chamber, which contains either electro-rheological fluid or magneto-rheological fluid, respectively. However, the device of the ’929 reference is shown only schematically, and does not deal with important product issues, such as minimizing the non-working air gaps between the various elements which contain the lines of flux of the magnetic field, or providing a device which can have sufficient magnetic field strength, while having sufficient heat transfer capability to avoid overheating and cooking the fluid.

BRIEF SUMMARY OF THE INVENTION

It is accordingly an object of the present invention to provide an improved magneto-rheological fluid coupling having substantially reduced non-working air gaps in the magnetic field, thereby improving the efficiency and repeatability of operation of the fluid coupling.

It is another object of the present invention to provide an improved magneto-rheological fluid coupling which can have sufficient magnetic field strength, and at the same time, sufficient heat transfer capability.

Finally, it is an object of the present invention to provide an improved magneto-rheological fluid coupling which can achieve the above-stated objects, and in addition, eliminate the need for electrical brushes to maintain contact between stationary electrical leads and a rotating fluid coupling.

BRIEF DESCRIPTION OF THE DRAWINGS

FIG. 2 is an enlarged, fragmentary axial cross section, similar to FIG. 1, illustrating one important aspect of the present invention.

FIG. 3 is an enlarged, fragmentary axial cross section, similar to FIGS. 1 and 2, but on a slightly smaller scale than FIG. 2, illustrating the magnetic flux path of the present invention.

DETAILED DESCRIPTION OF THE PREFERRED EMBODIMENT

Figure 1:
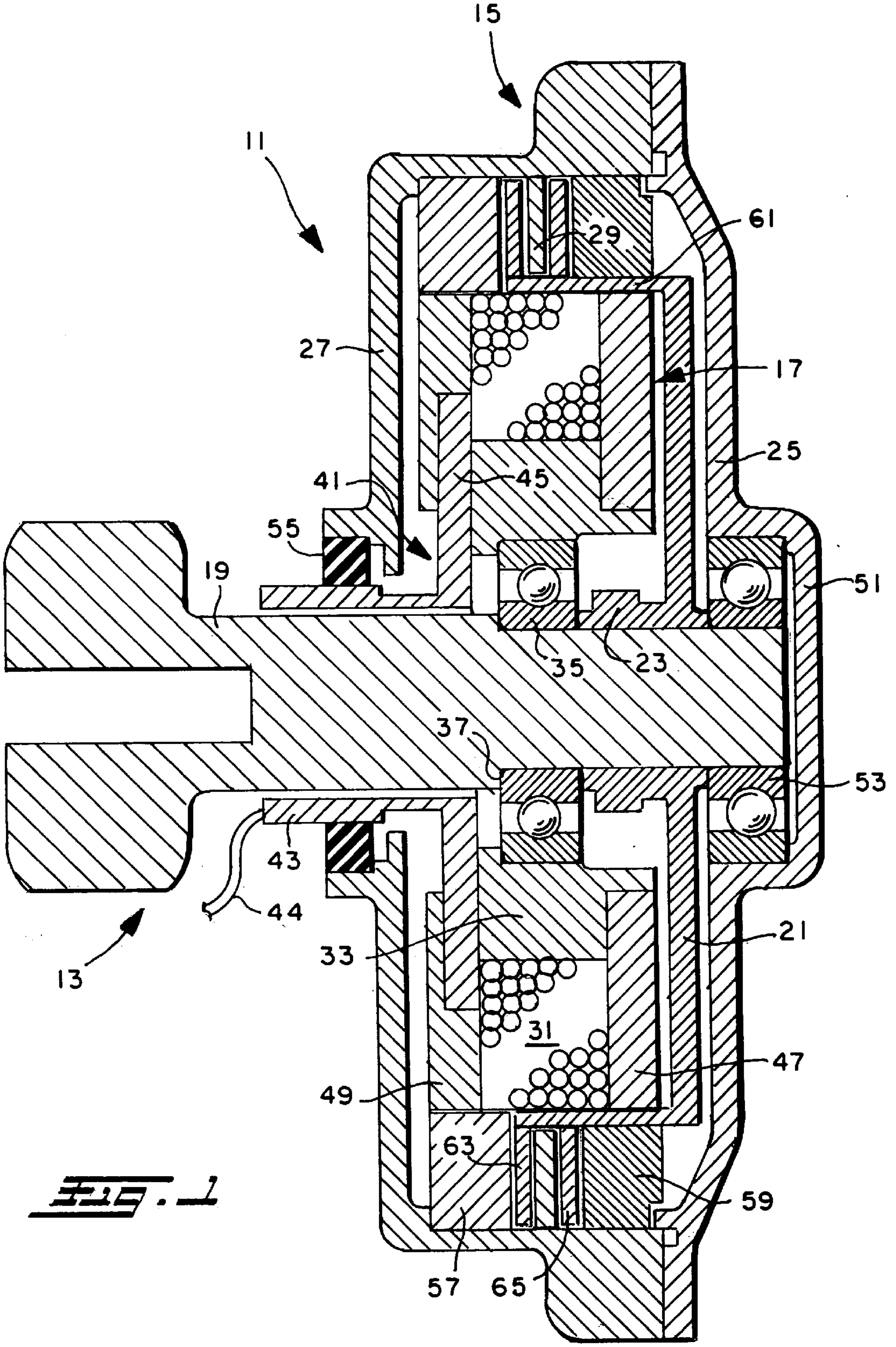
FIG. 1 is an axial cross section of a magneto-rheological fluid coupling made in accordance with the teachings of the present invention.

Referring now to the drawings, which are not intended to limit the invention, FIG. 1 illustrates a magneto-rheological (MR) fluid coupling made in accordance with the present invention. The MR fluid coupling, generally designated 11, may be viewed as comprising three separate portions, including an input coupling portion 13, an output coupling assembly, generally designated 15, and a stationary coil portion 17.

The input coupling portion 13 includes an input shaft 19, which receives input drive torque from a source, not shown herein, but which typically comprises the vehicle engine. The input coupling portion 13 also includes a generally radially extending, annular drive member 21 having, at its radially inner periphery, a hub portion 23 which is preferably pressed onto the input shaft 19. Thus, the drive member 21 is driven by the input shaft 19, through the hub portion 23.

The output coupling assembly 15 includes a forward housing member 25 and a rearward housing member 27, the housing members 25 and 27 being joined or attached to each other, to rotate together, in a manner well known to those skilled in the art. Preferably, the housing members 25 and 27 comprise die cast aluminum parts, as is now typically the case with commercially available viscous fan drives. Extending radially inward from the rearward housing member 27 is a generally disc-like output coupling member 29, the function of which will be described further subsequently. Typically, the output coupling assembly 15 rotates at output speed, and has attached thereto some sort of output device (not shown herein), such as the radiator cooling fan for cooling the radiator of a vehicle engine. The cooling fan would be attached to the output assembly 15, and more likely to the forward housing member 25, in a manner well known to those skilled in the art, and which forms no part of the invention.

In accordance with one important aspect of the present invention, the coil portion 17 is stationary, relative to the vehicle engine, and includes an electromagnetic coil 31, which is wound about a ferro-magnetic support member 33. The support member 33 is pressed onto the outer race of a bearing set 35, the inner race of which is disposed about the input shaft 19, between a shoulder 37 and the hub portion 23. Thus, the relative axial position of the input portion 13 and the coil portion 17 is fixed.

The coil portion 17 also includes a contact arrangement, generally designated 41, having a cylindrical contact member 43, adapted to be connected to an electrical input signal 44, shown only schematically herein. It is one important aspect of the invention that the connection of the signal 44, typically an electrical wire, to the contact member 43 is a fixed, permanent connection, as opposed to some sort of moving contact, such as a set of brush contacts. The contact arrangement also includes a generally annular, radially extending contact member 45 which is connected to the electromagnetic coil 31 in any suitable manner. Finally, the arrangement includes forward and rearward ferro-magnetic members 47 and 49, respectively, which are fixed to the non-rotatable with respect to the coil 31. The function of the members 47 and 49 will be described in greater detail subsequently.

The forward housing member 25 includes an annular portion 51, and received within the portion 51 is a bearing set 53 which rotatably supports the forward end of the input shaft 19. At a radially inner periphery of the rearward housing 27 is a seal member 55, the radially inner surface of which is seated on the cylindrical contact member 43, to substantially prevent fluid leakage therebetween. A ferro-magnetic member (or flux ring) 57 is fixed within the rearward housing 27, and rotates therewith, and similarly, a ferro-magnetic member (or flux ring) 59 is fixed within the rearward housing 27, but toward the forward end thereof, and rotates with the housing 27.

Referring now primarily to FIG. 2, in conjunction with FIG. 1, it may be seen that the drive member 21 includes an annular portion 61 which is disposed in surrounding relationship to the ferro-magnetic member 47, and also in surrounding relationship to a major portion of the coil 31. At the rearward end (left end in FIGS. 1 and 2) of the annular portion 61, there is fixed a pair of disc-like input coupling members 63 and 65, disposed on axially opposite sides of the output coupling member 29. Although the output coupling member 29 and the input coupling members 63 and 65 are shown herein as being formed integrally with the rearward housing 27 and annular portion 61, respectively, those skilled in the art will understand that it will be necessary to, for example, press the member 63 onto the portion 61, then press the member 29 into the housing 27, and finally, press the member 65 onto the portion 61.

As may best be seen in FIG. 2, the flux ring 57 includes a forward surface 67, and the flux ring 59 includes a rearward surface 69, such that the surfaces 67 and 69, and the output coupling member 29 cooperate with the input coupling members 63 and 65 to define a viscous shear chamber, generally designated 71. The shear chamber 71, in the subject embodiment, and by way of example only, includes four annular, radially-extending portions, the significance of which will become apparent subsequently. The shear chamber 71 is filled with a magneto-rheological fluid, of the type which is generally well-known in the art. An example of such a fluid is described in U.S. Pat. No. 5,667,715, incorporated herein by reference.

In accordance with one important aspect of the invention, as best seen in FIG. 2, the only non-working air gaps in the clutch 11 are radial. As used herein, the term "non-working" in reference to air gaps denotes those which perform no useful work, i.e., in the present invention, those which do not contain viscous fluid and transmit torque. For example, there is a radial air gap between the ferro-magnetic member 49 and the flux ring 57, and there is a pair of radial air gaps between the ferro-magnetic member 47 and the annular portion 61 and between the annular portion 61 and the flux ring 59. As is well known to those skilled in the art of electro-magnetic devices, it is almost always a design objective to reduce the number of non-working air gaps, as well as their likely effect on the operation of the electromagnetic device. As is also well known, it is generally easier to control the tolerance on a radial air gap than on an axial air gap, and therefore, the fact that the device of the present invention utilizes only radial non-working air gaps will result in more consistent, repeatable operation. In other words, whenever the input electrical signal 44 to the coil 31 varies, the output speed of the coupling 11 will vary in a predictable, corresponding manner. Also, there should be less hysteresis, i.e., the curve of output speed vs. coil current should be nearly the same when the current decreases as it was when the current increases.

Another important feature of the present invention is that, by locating the viscous shear chamber 71 radially outward from the coil 31, the shearing of viscous fluid is occurring at a larger diameter, thus generating greater torque than would be the case if the coil were located radially outward from the shear chamber. By arranging the coupling members 29, 63, and 65 radially, the major portion of the shear chamber 71 is oriented radially, such that there are lines of flux 73 (see FIG. 3) of the magnetic field which are oriented perpendicular to the major portion of the shear chamber 71.

Finally, the provision of the stationary coil assembly 17 simplifies the overall device, because there is no need to utilize slip rings, or other similar structure, to transmit the input signal to the coil. Instead, there can be a fixed connection of the leads 44 to the cylindrical contact member 43, thus making the overall device simpler, less expensive, and easier to install on the vehicle engine. The stationary coil assembly 17 will also result in a fluid coupling which is more reliable in operation, because of the absence of rubbing parts, such as electrical brushes and their associated contact surfaces.

As the input electrical signal 44 to the coil 31 is varied, the strength of the magnetic field varies, as is well known, and as the magnetic field strength varies, the viscosity of the magneto-rheological fluid varies generally proportionately. The variation in fluid viscosity results in a corresponding variation in the torque transmitted from the input shaft 19 through the input coupling members 63 and 65 to the output coupling member 29 (and flux rings 57 and 59), and to the housing members 25 and 27. As the torque transmitted to the output coupling assembly 15 varies, so does the output speed, and, in the case of a fan drive, control of the output speed (and therefor, fan speed) is the ultimate goal.

Although the device shown herein has two input discs 63 and 65, and one output disc 29, plus the surfaces 67 and 69 of the flux rings 57 and 59, to define the shear chamber 71, those skilled in the art will understand that both the number and arrangement of both input and output members could vary.

The invention had been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A magneto-rheological fluid coupling including an input coupling member driven by an input drive assembly having an input drive member, an output coupling assembly including an output coupling member, said input and output coupling members defining a viscous shear chamber; an electromagnetic coil operably associated with said input and output coupling members to generate a magnetic field passing through said viscous shear chamber, and contact means operable to transmit an electrical input signal to said electro-magnetic coil; and ferro-magnetic means operably disposed to direct lines of flux of said magnetic field; characterized by:

(a) said electro-magnetic coil and said contact means being stationary, and disposed in a generally surrounding relationship relative to said input drive member, and being surrounded by said output coupling assembly;

(b) said input and output coupling members defining said viscous shear chamber at a location disposed radially outward from said electro-magnetic coil; and (c) said input drive assembly including a drive member extending radially from said input drive member, and at least partially surrounding said electro-magnetic coil, said drive member being in driving relationship with said input coupling member.

2. A magneto-rheological fluid coupling as claimed in claim 1, characterized by said input drive member comprising an input shaft adapted to be driven by a source of input torque.

3. A magneto-rheological fluid coupling as claimed in claim 2, characterized by said ferro-magnetic means including a first ferro-magnetic member disposed radially inward from said electro-magnetic coil, and a bearing member disposed radially between said input shaft and said first ferro-magnetic member.

4. A magneto-rheological fluid coupling as claimed in claim 1, characterized by said input coupling member comprising a radially oriented disc-like member, and said output coupling member comprising a radially oriented disc-like member, said viscous shear chamber, over at least a major portion thereof, being oriented radially, whereby said magnetic field lines of flux are oriented generally perpendicular to said viscous shear chamber.

5. A magneto-rheological fluid coupling as claimed in claim 4, characterized by one of said input and output coupling members comprising a plurality of radially oriented disc-like members, thereby cooperating with the other of said input and output coupling members to define a plurality of radially oriented portions of said viscous shear chamber.

6. A magneto-rheological fluid coupling as claimed in claim 2, characterized by said contact means comprising a generally cylindrical contact member surrounding at least a portion of said input shaft.

7. A magneto-rheological fluid coupling as claimed in claim 6, characterized by said output coupling assembly including a housing member and seal means disposed radially between said cylindrical contact member and said housing member.

8. A magneto-rheological fluid coupling as claimed in claim 1, characterized by said ferro-magnetic means comprising ferro-magnetic members disposed forwardly and rearwardly of said electromagnetic coil, and fixed relative thereto to be stationary, said drive member including an annular portion surrounding one of said ferro-magnetic members.

9. A magneto-rheological fluid coupling as claimed in claim 1, characterized by said ferro-magnetic means comprising ferro-magnetic members disposed forwardly and rearwardly of said input and output coupling members, each of said ferro-magnetic members being fixed for rotation with one of said input and output coupling members.

10. A magneto-rheological fluid coupling as claimed in claim 1, characterized by said output coupling assembly comprising forward and rearward housing members, each comprising a non-ferro-magnetic material.

11. A magneto-rheological fluid coupling as claimed in claim 10, characterized by each of said forward and rearward housing members comprising a die cast aluminum member.

* * * * *